US012557830B2

(12) United States Patent
Murray

(10) Patent No.: US 12,557,830 B2
(45) Date of Patent: Feb. 24, 2026

(54) METHOD OF PRODUCING HYDROGEN WATER

(71) Applicant: Pouch Pac Innovations, LLC, Sarasota, FL (US)

(72) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 921 days.

(21) Appl. No.: 17/531,174

(22) Filed: Nov. 19, 2021

(65) Prior Publication Data

US 2022/0117270 A1 Apr. 21, 2022

Related U.S. Application Data

(63) Continuation-in-part of application No. 15/499,237, filed on Apr. 27, 2017, now Pat. No. 11,224,239.

(60) Provisional application No. 63/116,471, filed on Nov. 20, 2020, provisional application No. 62/328,324, filed on Apr. 27, 2016.

(51) Int. Cl.

| | |
|---|---|
| *A23L 2/54* | (2006.01) |
| *A23L 2/38* | (2021.01) |
| *B65B 39/12* | (2006.01) |
| *B65D 75/58* | (2006.01) |
| *C02F 1/32* | (2023.01) |
| *C02F 1/68* | (2023.01) |

(52) U.S. Cl.
CPC ...... *A23L 2/54* (2013.01); *A23L 2/38* (2013.01); *B65B 39/12* (2013.01); *B65D 75/5883* (2013.01); *C02F 1/32* (2013.01); *C02F 1/68* (2013.01); *B65D 2575/583* (2013.01)

(58) Field of Classification Search
None
See application file for complete search history.

(56) References Cited

U.S. PATENT DOCUMENTS

| | | | | |
|---|---|---|---|---|
| 3,834,430 A | * | 9/1974 | Fechheimer | .......... B67C 3/2634 |
| | | | | 141/181 |
| 6,241,122 B1 | * | 6/2001 | Araki | ................... B65D 51/223 |
| | | | | 222/464.2 |
| 2005/0224996 A1 | | 10/2005 | Yoshida | |
| 2005/0271306 A1 | * | 12/2005 | Murray | ................... B65B 43/54 |
| | | | | 53/469 |
| 2010/0276450 A1 | * | 11/2010 | Fergusson | ............... B65B 9/213 |
| | | | | 206/524.4 |
| 2011/0198236 A1 | | 8/2011 | Sumita | |
| 2016/0176584 A1 | * | 6/2016 | Ishihara | ............... B65D 75/008 |
| | | | | 493/243 |
| 2016/0185517 A1 | * | 6/2016 | Matsumoto | ............ B65D 65/40 |
| | | | | 383/105 |
| 2016/0249668 A1 | | 9/2016 | Igarashi | |
| 2017/0080022 A1 | * | 3/2017 | Levy | ..................... A61K 33/10 |
| 2019/0085279 A1 | * | 3/2019 | Leo | ........................ A23B 70/30 |
| 2019/0350244 A1 | * | 11/2019 | Kamleh | ................... A23L 2/84 |

FOREIGN PATENT DOCUMENTS

JP 2016074223 A 5/2016

OTHER PUBLICATIONS

Meiqian: published as CN 108992337 A on Dec. 14, 2018. (Year: 2018).*
Katou: published as WO2016199930 on Dec. 15, 2016. (Year: 2016).*
SDF: Safe Drinking Water: Bottled Water; published at least by Mar. 18, 2016 at https://web.archive.org/web/20160318070352/http://www.safewater.org/images/Bottled_Water.pdf (Year: 2016).*
OT: Oxidation Technologies, LLC: Venturi injector for gas into water; published online at least by Feb. 12, 2017 at: https://web.archive.org/web/20170212183019/https://www.oxidationtech.com/products/accessories/ozone-injection/ozone-venturi.html (Year: 2017).*
Lenntech: Venturi; published online at least by Oct. 20, 2006 at: https://web.archive.org/web/20061020223144/https://www.lenntech.com/venturi.htm (Year: 2006).*
Diao: Antibacterial, Heart-strengthening And Liver-protecting Hydrogen-enriched Low-sugar Healthcare Beverage And Preparation Method Thereof; CN 107996931 A; Published: May 8, 2018. (Year: 2018).*
Lu: A Hydrogen Beverage Machine; CN 108862533 A; Published: Nov. 23, 2018. (Year: 2018).*
Tanaka: Dependencies of hydrogen-water on mineral-based hardness, temperatures and the container materials, and effects of the oral washing and drinking; Med Gas Res. 2020; 10(2):67-74. (Year: 2020).*
Samuelson: published as WO 215/042475 A1 on Mar. 26, 2015. (Year: 2015).*
Brain: How Thermoses (Vacuum Flasks) Work; published online at least by Mar. 22, 2016 at: https://web.archive.org/web/20160322143920/http://home.howstuffworks.com/thermos.htm/printable (Year: 2016).

* cited by examiner

*Primary Examiner* — Patricia A George

(74) *Attorney, Agent, or Firm* — Fishman Stewart PLLC

(57) ABSTRACT

A process of producing hydrogen water includes the steps of: providing a source of spring water; cooling the water to a temperature of from 33 to 38 degrees F.; providing a source of hydrogen gas; contacting the cooled water with the hydrogen gas in a venturi injector forming micro-sized hydrogen bubbles in the water and diffusing hydrogen gas into the cooled water; recirculating the water through the venturi injector until a predetermined hydrogen content in the water is realized forming hydrogen water having a hydrogen content of from 3 to 10 parts per million.

20 Claims, 4 Drawing Sheets

METHOD OF PRODUCING HYDROGEN WATER

CROSS-REFERENCE TO RELATED APPLICATIONS

The instant application claims priority to U.S. Provisional Application Ser. No. 63/116,471 filed Nov. 20, 2020 and is a CIP application of U.S. application Ser. No. 15/499,237 filed on Apr. 27, 2017 which claims the benefit of U.S. Provisional Application 62/328,324 filed on Apr. 27, 2016 and the entire contents of which are incorporated herein by reference.

FIELD OF THE INVENTION

The invention relates to a process of producing hydrogen water and a process of filling a pouch with hydrogen water.

BACKGROUND OF THE INVENTION

Hydrogen-enriched water is being produced as a drinking product. Hydrogen is diffused through drinking water and is captured in spaces between the molecules of the water. Simple diffusion may result in a maximum of around 3 parts per million of hydrogen to water. However, hydrogen is quite light and will migrate from between the water molecules quite easily. Additionally, hydrogen will react with any oxygen that is present to produce water. Accordingly, filling of hydrogen water into containers such as flexible pouches must be carefully done in order to maintain hydrogen within the water and maintain a long shelf life for the product. There is therefore a need in the art for an improved process of producing hydrogen water and an improved process for packaging hydrogen water.

SUMMARY OF THE INVENTION

In one aspect, there is disclosed a process of producing hydrogen water comprising the steps of: providing a source of natural spring water; cooling the water to a temperature ranging from 33 to 38 degrees F.; providing a source of hydrogen gas; contacting the cooled water with the hydrogen gas in a venturi injector forming micro-sized hydrogen bubbles in the water and diffusing hydrogen gas into the cooled water forming hydrogen water having a hydrogen content of from 3 to 10 parts per million.

In another aspect, there is disclosed a process of producing hydrogen water comprising the steps of: providing a source of natural spring water; cooling the water to a temperature ranging from 33 to 38 degrees F.; providing a source of hydrogen gas; contacting the cooled water with the hydrogen gas in a venturi injector forming micro-sized hydrogen bubbles in the water and diffusing hydrogen gas into the cooled water; recirculating the water through the venturi injector until a predetermined hydrogen content in the water is realized forming hydrogen water having a hydrogen content of from 3 to 10 parts per million.

In a further aspect, there is disclosed a process of producing hydrogen water comprising the steps of: providing a source of natural spring water; cooling the water to a temperature ranging from 33 to 38 degrees F.; providing a source of hydrogen gas; contacting the cooled water with the hydrogen gas in a venturi injector forming micro-sized hydrogen bubbles in the water and diffusing hydrogen gas into the cooled water; recirculating the water through the venturi injector until a predetermined hydrogen content in the water is realized forming hydrogen water having a hydrogen content of from 3 to 10 parts per million; filling a pouch with the formed hydrogen water. The hydrogen water in the pouch may have a hydrogen content of from 3 to 4 parts per million.

DETAILED DESCRIPTION OF THE PREFERRED EMBODIMENTS

Figure 1:
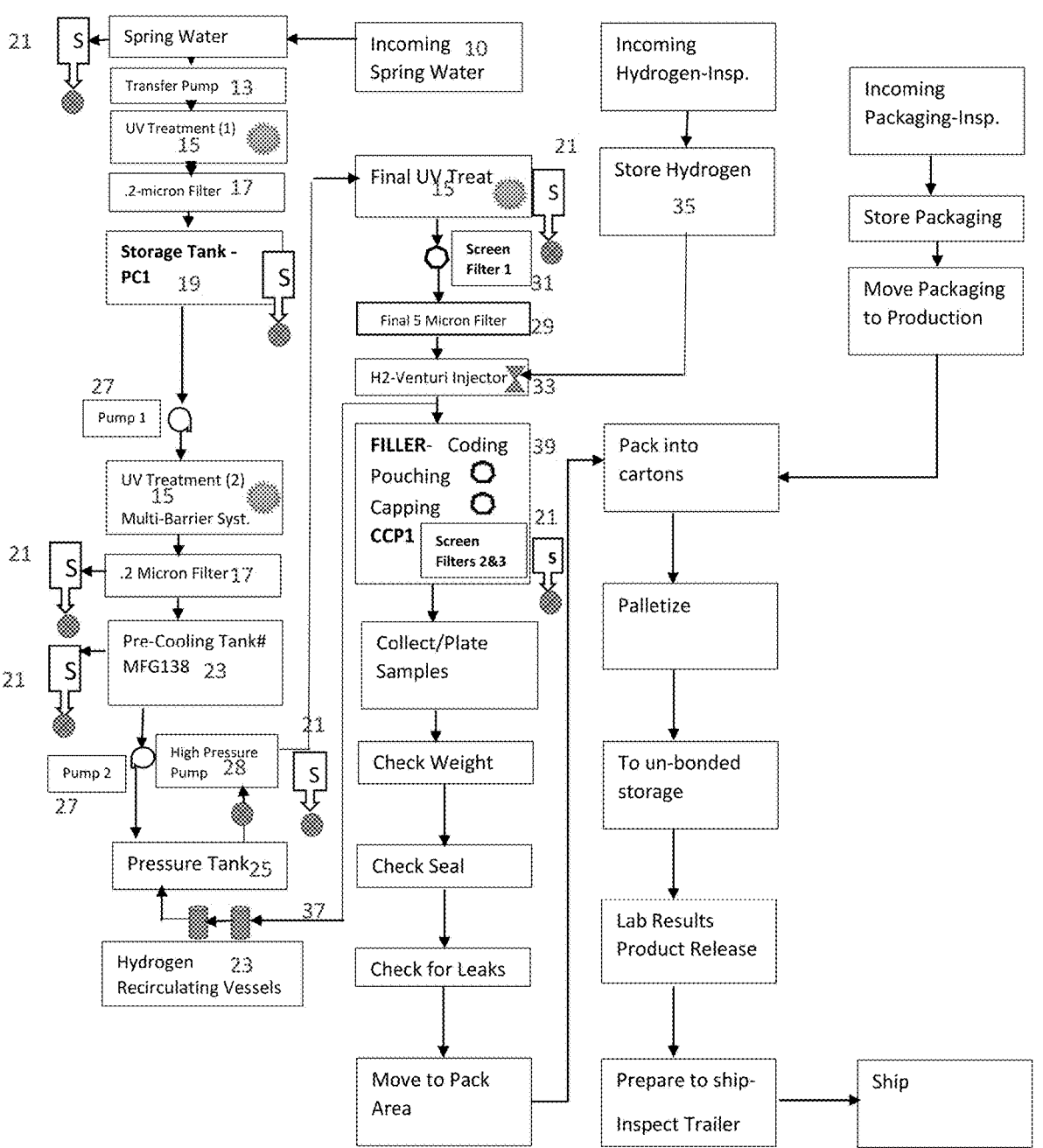
FIG. 1 is flow diagram of the process of producing hydrogen water.

An improved method for producing hydrogen-enriched water is shown in FIG. 1. The method includes the step of providing natural spring water 10. In one aspect, the spring water may include a naturally occurring amount of minerals such as potassium, calcium and magnesium. In one aspect, the spring water may have a total dissolved solids per million (TDS) of from 30 to 35. In a further aspect, the spring water may have a pH of from 7.0 to 7.4. The mineral content provides a water substrate that does not leach minerals from a person's body as can occur using a reverse osmosis water where all minerals are removed from the water.

Next, in a first portion of a multi-part filtration and decontamination, the water is moved using a transfer pump 13 and is then subjected to ultra-violet radiation 15 and micron sized filtration 17 and is routed to a storage tank 19. Sample outlets 21 are provided before the water is routed to the transfer pump 13 and in the storage tank 19.

The water in the storage tank 19 is moved by a pump 27 and is subjected to ultra-violet radiation 15 and micron sized filtration 17. In one aspect, the micron filtration 17 has a size of 0.2 microns. The water is then routed to a precooling tank 23 and cooled to a temperature less than ambient such as from 33 to 38 degrees F. The cooled water from the precooling tank 23 is then moved to a pressure tank 25 using a pump 27.

The cooled water from the precooling tank 23 is then moved to a venturi injector 33 using a high pressure pump 28. In one aspect, the high pressure pump 28 operates at pressures of from 23 to 30 psi.

The high pressure pump 28 moves water from the pressure tank 25 where it is subjected to ultra-violet radiation 15 and micron sized filtration 29. In one aspect, the micron filtration 29 has a size of 5 microns. A screen filter 31 having a mesh size of 5 is positioned between the ultra-violet radiation 15 and micron sized filtration 29.

Next, the water is passed through the venturi injector 33 and contacted with hydrogen gas 35. The venturi injector 33 may be a one inch venturi that narrows to ⅜ of an inch at a narrow portion of the venturi. The venturi injector 33 increases the surface area of contact of the hydrogen gas 35 with the water and forms micro-sized hydrogen bubbles in the water. The hydrogen gas 35 is diffused into the water across the venturi injector 33 resulting in a greatly enhanced presence of hydrogen in the water. In one aspect, the hydrogen gas may be introduced into the venturi injector 33 at a pressure of from 7 to 12 psi.

The water is then routed back to the pressure tank 25 in a loop 37 with the venturi injector 33. The water is circulated in the loop 37 until a predetermined hydrogen content in the water is attained. The loop 37 may including hydrogen recirculating vessels 39 that are connected to the pressure tank 25.

In one aspect, the water is circulated in the loop 37 until a hydrogen content of from 3 to 10 ppm is realized. The water may be circulated at a flow rate of approximately 12 gallons per minute when used with a 30 gallon pressure tank. The temperature in the loop is maintained at from 34 to 32 F.

Sample outlets 21 are provided throughout the flow path and allow for monitoring various parameters including the hydrogen content of the water. Following the diffusion of hydrogen in the loop 37 to a predetermined content, the water is packaged in a pouch at a filling station 39.

Figure 2:
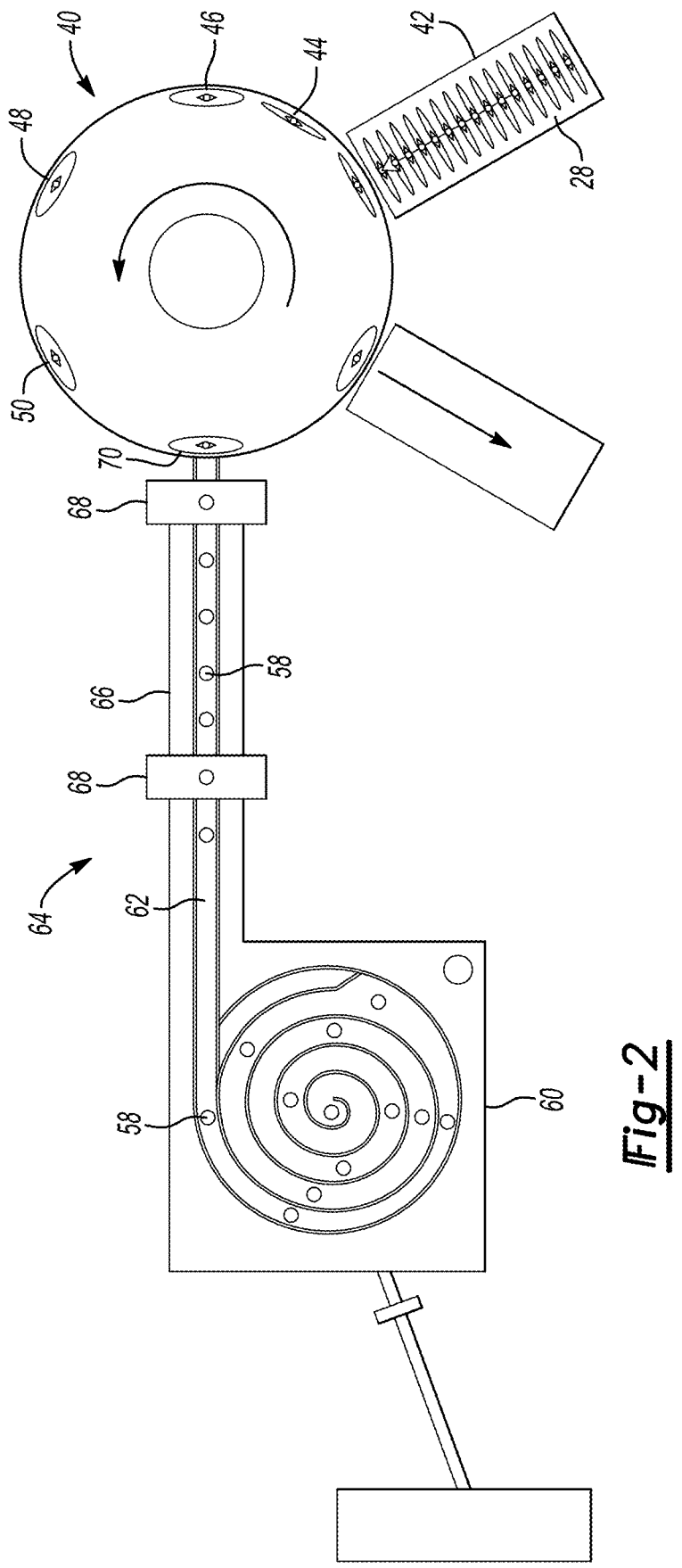
FIG. 2 is a diagram of a filling process for filling pouches with hydrogen water.
Figure 3:
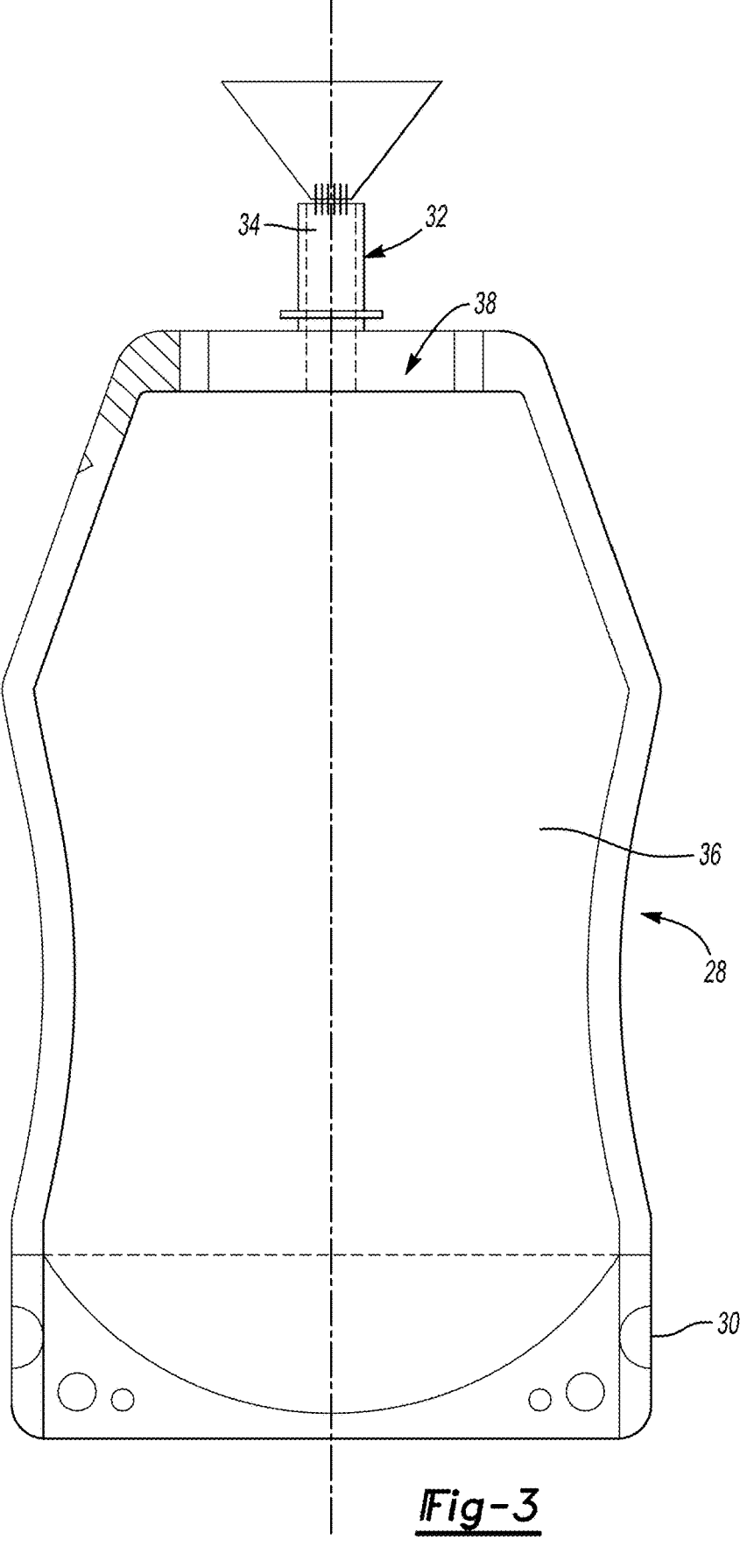
FIG. 3 is diagram of a pouch at a sterilization station.

While not being bound by theory, it is believed that the cooling of the water prior to contact with hydrogen expands the space between hydrogen atoms in the water molecule allowing hydrogen atoms of the hydrogen gas to be positioned in the space between the water hydrogen atoms for the unexpected high parts per million of hydrogen in the hydrogenated water with a subsequent stability for an extended period of time, such as from 2 to 12 months.
Method of Filling A method of filling containers such as flexible plastic foil laminate pouches is shown in FIG. 2. The pouches 28 may be formed from panels of flexible plastic/foil laminate. Although shown with respect to a stand up pouch with a bottom gusset 30, the method may be used with any type of container having a fitment 32 with a spout 34 and flexible walls 36. The pouches 28 are formed in a conventional manner and a fitment 32 is mounted between the top edges 38 of the pouch 28. As shown in FIG. 2, the pouches 28 are loaded onto a turret 40 at a first station 42. The pouches 28 are date coded at a second station 44. The pouch 28 is opened at a third station 46 and sterilized at a fourth station 48. As shown in FIG. 3, the pouch 28 may be sterilized by dry steam or infrared radiation or hydrogen peroxide gas.

In one aspect, the filling station may include an inert environment with nitrogen gas flooding the entire station and preventing oxygen from being introduced into the packing process maintain the hydrogen content of the water by preventing reaction of hydrogen with oxygen.

Figure 4:
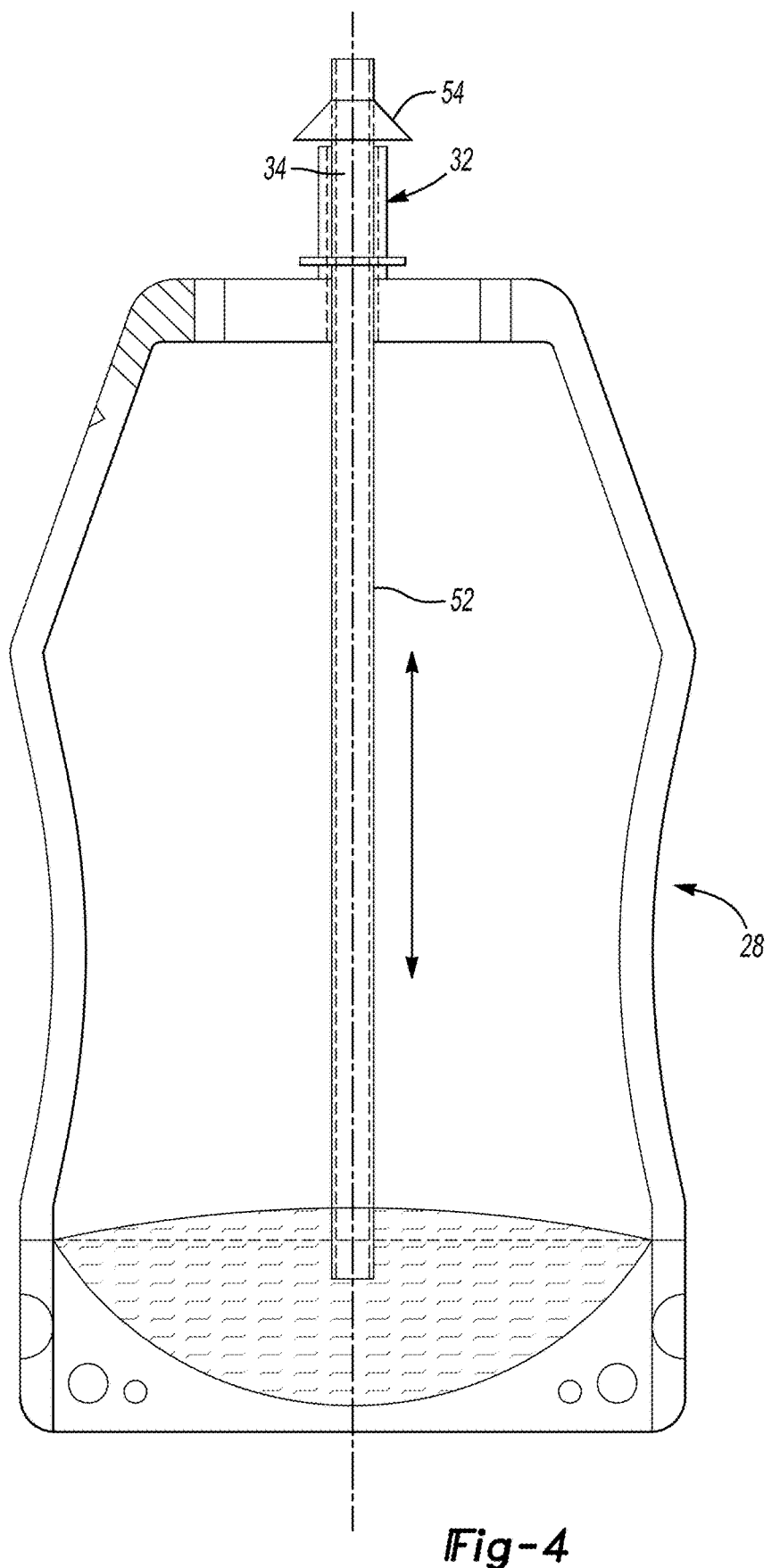
FIG. 4 is a diagram of a pouch at a filling station.

At the filling station 50, as shown at FIG. 4, a diving filling tube 52 is moved downwardly through a hood 54 and through the spout 34 of the fitment 32. The filling tube 52 is positioned approximately ½ inch from the bottom of the pouch 28. The hydrogen-enriched water is then delivered from a reservoir through the filling tube 52 to the bottom of the pouch 28. The filling tube 52 is held in this position until the hydrogen-enriched water rises approximately ⅛ inch over the bottom edge of the filling tube 52. The filling tube 52 is then raised at a rate which keeps the bottom edge of the filling tube 52 submersed beneath the level of the water so as to minimize turbulence. Turbulence from hydrogen-enriched water entering the pouch 28 through the filling tube 52 may result in dislodgement of the hydrogen molecules from between the water molecules. Thus, it is desirable to minimize the turbulence. The pouch 28 is filled to the very top of the spout 34 so that a meniscus is formed at the top of the spout 34.

The pouch is then moved to the capping station 50 as shown in FIG. 2. The caps 58 are delivered to the station from a bowl feeder 60 through a delivery tube 62. The bowl feeder 60 is housed in a chamber which is filled with nitrogen to prevent oxygen from contaminating the caps 58. The caps 58 are then fed through a sterilizing passage 64.

The sterilizing passage 64 has a center hydrogen peroxide gas chamber 66 positioned between two hot air chambers 68. The hot air chambers 68 keep the hydrogen peroxide gas from escaping. The caps 58 are sterilized as they pass through the hydrogen peroxide gas. At the end of the sterilization passage 64, the cap 58 is taken from the passage by a robotic arm 70 to be twisted onto the spout 34. Nitrogen gas is provided into the top of the pouch to prevent any oxygen contamination.

EXAMPLES

Example 1

A system including the apparatuses shown in FIG. 1 was provided including a storage tank 19, pumps 27, a pre-cooling tank 23, pressure tank 25, high pressure pump 28, recirculating vessels 23, venturi 33 and lines connected all of the components. Also provided are the filters and sanitizing apparatus described above.

Natural spring water from KeyStone Water Company of Lakewood Florida was provided and had a dissolved solid content measured at 20 ppm and the water was subjected to UV treatment and filtration and placed in a storage tank. The water was moved from the storage tank water and was subjected to UV treatment and filtration and placed in the pre-cooling tank. The water was cooled to 33 degrees F. The water was moved to the pressure tank and hydrogen was introduced into the water in the loop through the venturi. The water was circulated in the loop at a flowrate of 13-15 Gallons per minute. The water was maintained in the loop for a period of 2.0 hours. Hydrogen measurements were performed at a sample port located just prior to the filling station. The hydrogen content was measured at 3 ppm. The hydrogen water was then filled into pouches as described above.

Example 2

Natural spring water from KeyStone Water Company of Lakewood Florida was provided and had a dissolved solid content measured at 20 ppm and the water was subjected to UV treatment and filtration and placed in a storage tank. The water was moved from the storage tank water and was subjected to UV treatment and filtration and placed in the pre-cooling tank. The water was cooled to 33 degrees F. The water was moved to the pressure tank and hydrogen was introduced into the water in the loop through the venturi. The water was circulated in the loop at a flowrate of 13-15 Gallons per minute. The water was maintained in the loop for a period of 4.0 hours. Hydrogen measurements were performed at a sample port located just prior to the filling station. The hydrogen content was measured at 4 ppm. The hydrogen water was then filled into pouches as described above.

Example 3

Natural spring water from KeyStone Water Company of Lakewood Florida was provided and had a dissolved solid content measured at 20 ppm and the water was subjected to UV treatment and filtration and placed in a storage tank. The water was moved from the storage tank water and was subjected to UV treatment and filtration and placed in the pre-cooling tank. The water was cooled to 33 degrees F. The water was moved to the pressure tank and hydrogen was introduced into the water in the loop through the venturi. The water was circulated in the loop at a flowrate of 13-15 Gallons per minute. The water was maintained in the loop for a period of 6.0 hours. Hydrogen measurements were performed at a sample port located just prior to the filling station. The hydrogen content was measured at 5 ppm. The hydrogen water was then filled into pouches as described above.

Example 4

Natural spring water from KeyStone Water Company of Lakewood Florida was provided and had a dissolved solid content measured at 20 ppm and the water was subjected to UV treatment and filtration and placed in a storage tank. The water was moved from the storage tank water and was subjected to UV treatment and filtration and placed in the pre-cooling tank. The water was cooled to 33 degrees F. The water was moved to the pressure tank and hydrogen was introduced into the water in the loop through the venturi. The water was circulated in the loop at a flowrate of 13-15 Gallons per minute. The water was maintained in the loop for a period of 8.0 hours. Hydrogen measurements were performed at a sample port located just prior to the filling station. The hydrogen content was measured at 6 ppm. The hydrogen water was then filled into pouches as described above.

Example 5

Natural spring water from KeyStone Water Company of Lakewood Florida was provided and had a dissolved solid content measured at 20 ppm and the water was subjected to UV treatment and filtration and placed in a storage tank. The water was moved from the storage tank water and was subjected to UV treatment and filtration and placed in the pre-cooling tank. The water was cooled to 33 degrees F. The water was moved to the pressure tank and hydrogen was introduced into the water in the loop through the venturi. The water was circulated in the loop at a flowrate of 13-15 Gallons per minute. The water was maintained in the loop for a period of 10.0 hours. Hydrogen measurements were performed at a sample port located just prior to the filling station. The hydrogen content was measured at 7 ppm. The hydrogen water was then filled into pouches as described above.

Example 6

Natural spring water from KeyStone Water Company of Lakewood Florida was provided and had a dissolved solid content measured at 20 ppm and the water was subjected to UV treatment and filtration and placed in a storage tank. The water was moved from the storage tank water and was subjected to UV treatment and filtration and placed in the pre-cooling tank. The water was cooled to 33 degrees F. The water was moved to the pressure tank and hydrogen was introduced into the water in the loop through the venturi. The water was circulated in the loop at a flowrate of 13-15 Gallons per minute. The water was maintained in the loop for a period of 12.0 hours. Hydrogen measurements were performed at a sample port located just prior to the filling station. The hydrogen content was measured at 9 ppm. The hydrogen water was then filled into pouches as described above.

Example 7

Natural spring water from KeyStone Water Company of Lakewood Florida was provided and had a dissolved solid content measured at 20 ppm and the water was subjected to UV treatment and filtration and placed in a storage tank. The water was moved from the storage tank water and was subjected to UV treatment and filtration and placed in the pre-cooling tank. The water was cooled to 33 degrees F. The water was moved to the pressure tank and hydrogen was introduced into the water in the loop through the venturi. The water was circulated in the loop at a flowrate of 13-15 Gallons per minute. The water was maintained in the loop for a period of 14.0 hours. Hydrogen measurements were performed at a sample port located just prior to the filling station. The hydrogen content was measured at 10 ppm. The hydrogen water was then filled into pouches as described above.

As can be seen from the above, the process provides unexpectedly high hydrogen content to the cooled water from 3 to 10 ppm and provides hydrogen water in a pouch with high hydrogen content. After the initial two hour circulation the hydrogen content of the water increases 1 ppm after every additional 2 hours of circulation in the loop.

The invention claimed is:

1. A process of producing a hydrogen water beverage product comprising the steps of:
   providing a source of spring water;
   cooling the water to a temperature of from 33 to 38 degrees F.;
   providing a source of hydrogen gas;
   contacting the cooled water with the hydrogen gas in a venturi injector forming microsized hydrogen bubbles in the water and diffusing hydrogen gas into the cooled water forming hydrogen water having a hydrogen content of from 3 to 10 parts per million;
   recirculating the hydrogen water through the venturi injector in a recirculation loop under pressure with a temperature maintained at 32 to 34 degrees F.; and
   filling a container with the formed hydrogen water.

2. The process of claim 1 wherein the recirculation loop includes the venturi injector, a pressure tank, hydrogen recirculating vessels, a pump, and interconnecting circulation lines.

3. The process of claim 2 wherein the hydrogen content after recirculation is from 3 to 4 ppm.

4. The process of claim 1 wherein the spring water has a total dissolved solids per million of from 30 to 35.

5. The process of claim 1 wherein the spring water has a pH of from 7.0 to 7.4.

6. The process of claim 1, further including the step of:
   exposing the water to ultraviolet radiation; and/or
   filtering the water using micron sized filtration.

7. The process of claim 2, wherein the pump operates at pressures of from 23 to 30 psi.

8. The process of claim 2, wherein recirculating the hydrogen water through the venturi injector in the recirculation loop includes routing the hydrogen water from the venturi injector to the hydrogen recirculating vessels and the pressure tank, and back to the venturi injector via the pump.

9. The process of claim 1 wherein;
   the hydrogen gas is introduced into the venturi injector at a pressure of from 7 to 12 psi; and/or
   the water is circulated at a flow rate of from 12 to 15 gallons per minute.

10. The process of claim 1, wherein the container is a pouch.

11. The process of claim 1 wherein the step of filling the container includes providing a pouch having sealed flexible walls including a fitment and spout and loading the pouch in a turret of a filling station, wherein the filling station is provided in an inert environment with nitrogen gas flooding the filling station.

12. The process of claim 11 including the steps of date coding, opening and sterilizing the pouch.

13. The process of claim 12 including the steps of inserting a filling tube into the sterilized pouch proximate a bottom of the pouch and introducing the formed hydrogen water into the pouch and raising the filling tube at a rate such that the filling tube remains submerged in the hydrogen water.

14. The process of claim 10 wherein the pouch is filled to a top of the spout forming a meniscus at the top of the spout.

15. The process of claim 14 including the step of applying a cap to the spout.

16. The process of claim 15 wherein the step of applying a cap includes feeding caps through a sterilization passage and applying the cap to a spout of the pouch.

17. The process of claim 15 wherein the step of applying a cap includes forcing a portion of water out of the pouch prior to applying the cap to the spout.

18. A process of producing a hydrogen water beverage product comprising the steps of:
   providing a source of spring water;
   cooling the water to a temperature of from 33 to 38 degrees F.;
   providing a source of hydrogen gas;
   contacting the cooled water with the hydrogen gas in a venturi injector forming microsized hydrogen bubbles in the cooled water and diffusing hydrogen gas into the cooled water to form hydrogen water;

recirculating the hydrogen water through the venturi injector in a loop under pressure between a pressure tank and the venturi injector until the hydrogen water comprises a hydrogen content of from 3 to 10 parts per million; and
   filling a container with the formed hydrogen water.

19. A process of producing a hydrogen water beverage product comprising the steps of:
   providing a source of spring water;
   cooling the water to a temperature of from 33 to 38 degrees F.;
   providing a source of hydrogen gas;
   contacting the cooled water with the hydrogen gas in a venturi injector forming microsized hydrogen bubbles in the water and diffusing hydrogen gas into the cooled water to form hydrogen water;
   recirculating the hydrogen water through the venturi injector until the hydrogen water comprises a hydrogen content of from 3 to 10 parts per million;
   filling a pouch with the formed hydrogen water; and
   wherein the hydrogen water is recirculated through the venturi injector in a loop under pressure with a temperature maintained at 32 to 34 degrees F.

20. The process of claim 18, wherein the hydrogen water is recirculated through the venturi injector in the loop with a temperature maintained at 32 to 34 degrees F., and wherein the loop includes the venturi injector, the pressure tank, a hydrogen recirculating vessel, a pump, and interconnecting circulation lines.

* * * * *